United States Patent [19]
Johnson et al.

[11] Patent Number: 6,120,946
[45] Date of Patent: Sep. 19, 2000

[54] METHOD FOR PRINTING A COLOR FILTER

[75] Inventors: Ronald E. Johnson, Tioga, Pa.; Jean-Pierre Themont, Montigny sur Loing, France

[73] Assignee: Corning Incorporated, Corning, N.Y.

[21] Appl. No.: 09/126,578

[22] Filed: Jul. 30, 1998

Related U.S. Application Data

[63] Continuation-in-part of application No. 08/872,633, Jun. 10, 1997, Pat. No. 6,001,515, which is a continuation of application No. 08/598,311, Feb. 8, 1996, abandoned, which is a continuation of application No. 08/324,345, Oct. 17, 1994, Pat. No. 5,514,503.

[60] Provisional application No. 60/054,411, Jul. 31, 1997.

[51] Int. Cl.[7] .............................. G02B 5/20; G02F 1/1335
[52] U.S. Cl. ............................................... 430/7; 101/170
[58] Field of Search ........................ 430/7, 321; 101/170

[56] References Cited

U.S. PATENT DOCUMENTS

| | | | |
|---|---|---|---|
| 5,127,330 | 7/1992 | Okazaki et al. | 101/450.1 |
| 5,201,268 | 4/1993 | Yamamoto et al. | 101/170 |
| 5,514,503 | 5/1996 | Evans et al. | 430/7 |

FOREIGN PATENT DOCUMENTS

9-318803  12/1997  Japan .

*Primary Examiner*—John A. McPherson
*Attorney, Agent, or Firm*—Maurice M. Klee; Scott S. Servilla

[57]  ABSTRACT

A method of making an imaged ink pattern, wherein an ink receiving surface is formed which has a raised surface pattern thereon and ink is transferred to the raised surface pattern by bringing the raised surface pattern into contacting relationship with an intaglio ink imaging pattern. The raised surface pattern is extended into the intaglio ink imaging pattern so that only the raised surface pattern of the ink receiving surface contacts the ink in the intaglio ink imaging plate.

10 Claims, 4 Drawing Sheets

METHOD FOR PRINTING A COLOR FILTER

This application is a continuation-in-part of application Ser. No. 08/872,633, filed Jun. 10, 1997, now U.S. Pat. No. 6,001,515, which is a continuation of application Ser. No. 08/598,311, filed Feb. 8, 1996, now abandoned, which is a continuation of application Ser. No. 08/324,345, filed Oct. 17, 1994, which issued as U.S. Pat. No. 5,514,503 on May 7, 1996.

This application claims the benefit under 35 USC §119(e) of U.S. Provisional Application No. 60/054,411, filed Jul. 31, 1997.

FIELD OF THE INVENTION

The invention relates to color filters for liquid crystal display panels and methods and apparatus for their production.

BACKGROUND OF THE INVENTION

Liquid crystal display (LCD) panels, particularly color LCD panels, are used for flat screen televisions, projection television systems and camcorder view finders, with many more applications anticipated in the future.

The fabrication of an active matrix liquid crystal display typically involves several steps. In one step, the front glass panel is prepared. This involves deposition of a color filter element onto a suitable substrate, such as glass. Color filter deposition typically involves depositing a black matrix pattern and three primary (typically either red, green and blue in the case of transparent or substractive color filter) colors for color cell patterns within the spaces outlined by the black matrix. The printed lines which form the black matrix typically are about 15–40 microns wide and about 0.5 to 3 microns thick. The red, green, and blue color cells are typically on the order of about 70–100 microns in width by 200 to 300 microns in length. The color cells are typically printed in films less than about 10 microns thick, and preferably less than 5 microns thick, and must be evenly applied and accurately registered within the pattern formed by the black matrix. The front glass substrate is typically completed by depositing a planarizing layer, a transparent conducting layer, and a polyimide alignment layer over the color filter element. The transparent conducting layer is typically indium tin oxide (ITO), although other materials can also be utilized.

In a second step, a separate (rear) glass panel is used for the formation of thin film transistors or diodes, as well as metal interconnect lines. Each transistor acts as an on-off switch for an individual color pixel in the display panel. The third and final step is the assembly of the two panels, including injection of a liquid crystal material between the two panels to form the liquid crystal panel.

One critical step in the manufacture of the display is the preparation of the black matrix and color filter pattern. The sharpness of edge definition of the black matrix is extremely important. Unlike the colored ink cells, any variation in the black matrix edge, due to printing flow and so forth, is readily discernible when inspecting the final product. The color pixel edge, on the other hand, is typically hidden by the black matrix pattern. Consequently, to a certain extent the black matrix hides variability in the color pixel edge, while there is nothing to hide variability in the black matrix.

Consequently, black matrix patterns are typically prepared using photolithographic techniques, even where the remainder of the color filter pattern is produced using printing techniques. Photolithographic techniques involve a large number of production steps, and are much more complex than printing methods. In addition, photolithographic techniques are typically much more expensive than ink printing techniques.

Another critical step in color filter formation is the formation of the red, green and blue color dots (also referred to as color cells) of the color filter. Such color cells preferably should be deposited so that they are as smooth and uniform in thickness as possible. Previous attempts to print color filter patterns have resulted in color patterns having insufficient smoothness. This is largely because the ink depositing methods of the prior art resulted in ink cells which were rounded or triangular in cross section. Consequently, a planarizing layer is commonly applied over the color patterns to alleviate imperfections in coating smoothness or thickness uniformity due to the deposition process. The transparent planarizing layer also serves to protect against ion migration into the liquid crystal. The planarizing layer should be deposited to be as smooth and flat as possible.

To facilitate deposition of a flat planarizing layer, it is desirable that the color patterns be smooth, flat and substantially parallel to the undersurface of the glass substrate. Uniform thickness color patterns are desirable for obtaining optimum display contrast and color performance, because if the thickness of the pattern varies, the transmitted light intensity will vary.

One other problem with forming multicolored ink color filter patterns is preventing the different colored inks from mixing with one another. In the past, this problem has been solved by depositing the colors and drying and/or curing them one at a time.

U.S. Pat. Nos. 5,544,582 and 5,514,503 describe processes for making color filters wherein a multi-colored ink pattern is deposited onto a transfer layer which is carried by a collector roll. The composite multi-colored pattern/transfer layer is then transferred to a glass substrate to form a color filter.

Typically, the black matrix ink in such processes is transferred from an intaglio plate to the transfer layer. Prior to the transfer to the transfer layer, the black matrix intaglio plate is doctored with the intent of leaving ink only in the recesses. However, during this doctor blading step, the doctor blade can often leave a thin residue of black matrix ink between the intaglio recesses. If so, this residual black matrix ink ends up being transferred to the transfer layer into areas where the black matrix ink is not desired. A thin layer of black ink left on the top surface of the intaglio plate after doctoring is called haze. Transfer of this haze undesirably reduces transmission in the colored sub-pixel ink areas. Even when doctoring blade and operating parameters have been optimized for haze-free doctoring, the doctoring process is typically not a robust process for continuous printing of the black matrix for color filters. Particulates can get trapped behind the blade and cause clear streaks in the doctored black matrix. In addition, blades can become chipped, especially when doctoring intaglio plates constructed of hard materials. The resultant chips or grooves in the blade leave poorly doctored ink lines or black streaks in the regions intended to be clear. In order to achieve haze-free conditions, especially with fine particle inks, the blade pressures need to be high and this can result in chipping of the intaglio plate or degradation of the release coat on the intaglio plate.

SUMMARY OF THE INVENTION

The present invention relates to methods for forming a color filter, particularly color filters for liquid crystal display applications. In the present invention, a transfer layer having a raised surface pattern thereon is employed to form a color filter. The raised surface pattern defines a recessed surface pattern which consists of a plurality of recessed cells which accept the colored inks which make up the color filter pattern. The transfer layer is preferably supported on a collector device. The raised surface pattern on the transfer layer can be formed, for example, via an embossing operation in which the transfer layer is contacted with an intaglio recessed pattern. The transfer layer can be first applied to the collector surface and then embossed, for example, via radiation curing against a release coated intaglio plate under compression. Alternatively, the transfer layer can be applied directly onto the release coated intaglio plate surface and transferred to the collector surface from the release coated intaglio plate due to the collector surface having greater adhesion thereto. In this embodiment, the transfer layer is preferably cured during transfer to the collector. The collector device employed could be a collector roll or a collector plate or other shape of collector device as desired.

The present invention is based upon the discovery that if the collector device is a flat surface or a roll of sufficiently large diameter, air is entrapped in the cells between the raised matrix pattern on the collector surface when it is brought into contact with an inked surface, also either of flat or sufficiently large diameter. This air entrapment is caused by a seal being formed where the liquid ink retained in the intaglio recess meets the raised pattern array. The resultant entrapped air prevents contact between the inked surface and the cell bottom. Consequently, black ink can be applied solely to the raised matrix pattern from a flat, or sufficiently large diameter, inking surface. The raised pattern thus functions in a manner analogous to a typographic imaging surface.

In the preferred embodiment of the present invention, ink, such as a black matrix ink, is applied to the raised surfaces by bringing the raised surface pattern into contacting relationship with an intaglio ink imaging pattern having the same pitch as the raised pattern. The intaglio pattern has recesses which contain the ink to be transferred to the raised surface pattern. The grid lines comprising the raised surface pattern are preferably narrower dimensionally than the ink receiving recesses of the intaglio plate. The raised surfaces of the raised surface pattern extend into the recesses of the intaglio ink imaging plate during transfer of the ink to the raised surfaces. Although an intaglio surface is employed for applying the black ink to the raised pattern, it is not necessary to doctor the intaglio surface to a haze-free state. It still may be desirable to employ a doctor blading process to remove excess ink from the non-recessed area of the intaglio plate, but a residual layer of ink can remain over the entire surface of the intaglio plate without negatively impacting on the process performance. This is because as described above a seal is formed between the raised pattern and the liquid ink entrapping as described above air in the cells, thereby preventing contact in the region between the intaglio plate and the raised pattern. The advantage of using an intaglio plate for inking is the precise dimensions of the intaglio pattern may be preserved upon transfer, especially if the ink is hardened during transfer thereto. Of course, the intaglio plate and ink should each be selected of materials to permit transfer of the ink to the raised pattern. In this way, transfer of the ink to the raised surface pattern can be achieved without the portions of the transfer layer between the raised surface patterns contacting ink from the intaglio recessed pattern. In this way, regions between the raised surface pattern are kept ink free, and the difficulties commonly encountered with doctoring are avoided.

In a preferred embodiment, the black matrix ink is cured during the black matrix ink transfer step. Most preferably, the black matrix ink is transferred from an intaglio imaging plate having areas which are selectively radiation blocking to prevent curing of the black matrix pattern in the non-image areas. For example, such imaging plates could be made of a transparent material such as glass, or fused silica, and the regions corresponding to the intaglio recesses made to be radiation transmitting, while the regions between the intaglio recessed areas could be made to be radiation blocking, such as by employing a masking material between the recessed areas. A suitable masking material, for example, is a sputtered deposited film of silicon which does not transmit the radiation used to cure the ink. Consequently, by employing a radiation curable ink for the black matrix ink, and employing a radiation source behind the imaging plate, the black matrix ink can be cured during transfer to the raised surface area of the transfer layer. Ideally the intaglio plate is also release coated, such as with a fluorocarbon, silane, or other release agent, to facilitate transfer of the black ink to the raised pattern.

A plurality of colored inks are then applied into the recesses (i.e., between the black matrix ink) on the collector, each color ink being applied in a particular pattern, each color being at least partially separated from the other color by the raised surface pattern on the collector. In this way, the raised surface pattern helps separate the color patterns while they are supported on the collector device. The multicolored ink pattern is then transferred to a substrate to form a multicolored color filter pattern having recesses thereon, the recesses corresponding to the location of the raised surface pattern on the collector. The transfer process may be facilitated by hardening or curing the color pattern during transfer of the multicolor pattern to the substrate. For example, such hardening or curing could be accomplished by utilizing UV radiation curable inks for the multicolored inks and curing the inks during the transfer step by emitting radiation through the transparent glass substrate, thereby curing the ink pattern during the transfer process.

In a preferred embodiment, a second transfer layer is employed over the color filter pattern to facilitate removal of the color filter pattern from the collector. The second transfer layer essentially acts as an adhesive layer to facilitate removal of the first transfer layer, black matrix ink, and color inks from the collector. Ideally this adhesive layer which facilitates final transfer is preapplied as a thin (0.5–5 micron) layer on the glass surface. This layer is cured by UV radiation which is emitted through the glass substrate. This radiation cures the adhesive layer simultaneous with curing of the sub-pixel inks during the transfer of the transfer layer, black matrix pattern and colored inks from the collector to the glass. In an alternative option the sub-pixel inks can be precured by exposure to radiation while under compression against a release coated plate. In this case the pattern remains on the collector until transferred to glass by curing of the adhesive layer, also preferably by UV radiation while under compression.

The methods of the present invention result in a number of advantages over prior art methods for forming black matrix patterns. Because the raised surface pattern of the transfer layer is the only portion of the transfer layer which contacts the black ink from the intaglio recessed ink imaging pattern, doctoring is not a problem because, even if a thin film of residual black matrix ink is left on the intaglio patterning plate, this thin film never gets transferred to the transfer layer, as the portions of the intaglio plate having that residual black matrix ink never contact the transfer layer.

Using the methods of the present invention, it is possible to produce extremely accurate color ink and black matrix patterns having well defined square edges.

DETAILED DESCRIPTION OF THE INVENTION

Figure 1:
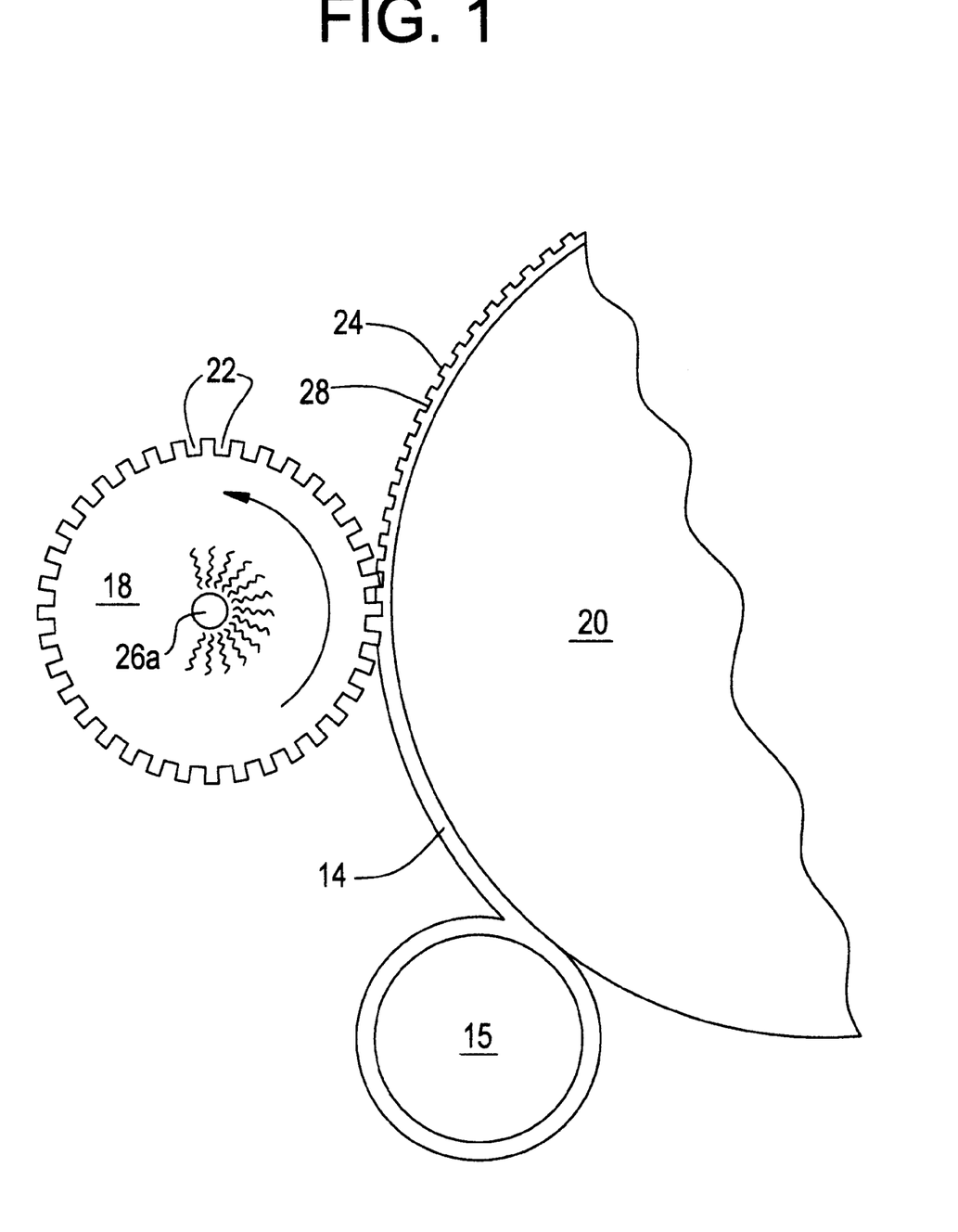
FIG. 1 illustrates a method of forming a raised pattern on a transfer layer in accordance with the present invention.

In FIG. 1, transfer layer 14 is transferred from transfer layer applicator roll 15 onto collector 20. Embossing roll 18 has a recessed pattern 22 thereon corresponding to a desired raised pattern 24 to be imparted to the transfer layer 14. Transfer layer 14 is preferably composed of a radiation curable material, and cured via UV light 26a which is emitted through embossing roll 18 during transfer to collector roll 20, to thereby solidify the transfer layer 14. Consequently, recessed pattern 22 on embossing plate 18 is imparted to the transfer layer 14 to form raised pattern 24 on transfer layer 14. The raised pattern 24 defines recessed regions 28 between the raised portions of raised pattern 24. Of course, alternative methods could be used to form the raised surface pattern 24. For example, in a preferred embodiment, a flat intaglio plate is substituted for embossing roll 18, and the transfer layer material 14 flooded or doctored over the flat intaglio plate, after which transfer of the raised pattern 24 is achieved to collector 20 in the same manner, i.e., by employing a radiation source behind a flat intaglio plate and curing the transfer layer material 14 during transfer to the collector 20.

Figure 2:
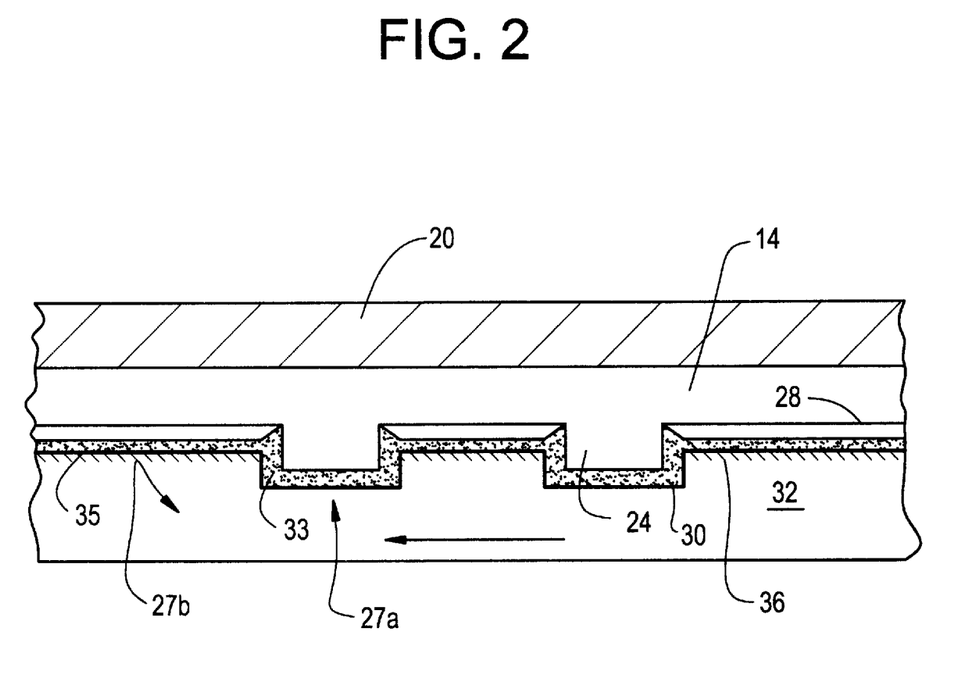
FIG. 2 illustrates deposition of the black matrix ink from the intaglio plate onto the raised pattern transfer layer formed by the process illustrated in FIG. 1.

After formation of raised pattern 24 on transfer layer 14, as illustrated in FIG. 2, the black matrix ink is deposited onto the raised patterns 24 of transfer layer 14. In FIG. 2, the black matrix ink 30 is retained in the recesses of intaglio plate 32. This is achieved by contacting intaglio plate 32 with an inking roll and then doctoring off excess black matrix ink 30, or alternatively by coating the intaglio plate with a thin layer of ink to fill the recesses. The raised portions 24 of transfer layer 14 are inserted into the recesses 33 of intaglio plate 32, and thereby into contacting relationship with black matrix ink 30. As illustrated in FIG. 2, a residual portion 35 of black matrix ink sometimes remains between the recesses of the intaglio plate 32, even after doctoring. However, using the method of the present invention, contact in the regions 28 between the raised pattern 24 and the black matrix ink 30 on intaglio plate 32 is minimized or eliminated. Consequently, the black matrix ink 30 is transferred only to the raised portions 24 of transfer layer 14, and the residual black matrix ink 35 left by the doctoring process is not transferred to the transfer layer.

The collector 20 preferably consists of a cushioning or elastomeric material (e.g. butyl rubber, silicone, polyurethane) to provide a cushioning effect to the printing process. This cushioning layer is preferably covered with a higher modulus layer (polyethylene terephthalate, metal foil, or a combination thereof). In a preferred embodiment, a cushioning layer of polyurethane which is 0.25 inches thick is covered with a nickel or steel metal foil between 0.003 and 0.006 inches thick. Optionally, a hardcoating of material may be deposited on top of this metal foil, such as, for example, an $SiO_2$ or diamond-like carbon coating of about 0.005 inches thick. The transfer layer is then deposited directly onto this coated PET surface. Such coatings could be deposited, for example, by vapor deposition techniques. Such collectors are further described in U.S. patent application Ser. No. 08/675,359, filed Jul. 2, 1996, now abandoned, the specification of which is hereby incorporated by reference.

In a preferred embodiment, black matrix ink 30 is a radiation curable ink, and the black matrix ink is cured during deposition thereof to the raised pattern on the transfer layer. Such curing can be facilitated by providing intaglio plate 32 with light blocking or masking regions 36 in the areas between the recesses 33, and positioning a UV light (not shown) behind intaglio plate. The radiation from the UV light, indicated by arrow 27A, passes through the unmasked pattern areas, but does not travel through light blocking regions 36, as indicated by arrow 27B. During the transfer of black matrix ink, radiation is then emitted from UV light. However, because of the masking 36, radiation only travels through the regions between the light blocking regions 36 and therefore only the ink in these regions becomes cured. Such light blocking regions 36 could be achieved, for example, by making intaglio plate 32 out of a radiation transparent material, such as glass, and selectively coating regions between the recessed pattern 33 with a radiation reflecting or absorbing material, such as a sputter deposited or vapor deposited silicon. Alternatively, the black ink could be hot melt material that by cooling solidifies and transfers upon contact with the embossed pattern. Of course, in this case selective masking is not necessary.

In a preferred embodiment, the recessed pattern 33 on intaglio plate 32 is wider dimensionally than the raised pattern 24 formed by the embossing operation illustrated in FIG. 1. Consequently, in the black matrix inking step illustrated in FIG. 2, the raised pattern 24 on transfer layer 14 does not have to be registered exactly to the center of the recessed pattern 33. Because radiation is only emitted through the recessed portions 33 of intaglio plate 32, the black matrix ink 30 is only cured and transferred in areas corresponding to these recessed channel areas 33. The black matrix ink 30 is thereby transferred to and thus encapsulates the raised pattern 24 on transfer layer 14, thereby forming a raised black matrix pattern suitable for receiving the colored inks that form the color filter pattern. The resultant black matrix pattern retains the dimensions of intaglio plate 32 and is independent of the intaglio plate used for embossing the transfer layer.

This black matrix transfer operation results in several advantages compared to methods of the prior art. During the black matrix ink transferring operation, one desirable effect is that air becomes entrapped in regions between raised pattern 24, as can be seen in FIG. 2. This trapped air facilitates prevention of the transfer of black matrix ink between these raised pattern areas 24. Consequently, because none of the residual black matrix ink caused by the doctoring process is transferred, the doctoring step is no longer as critical as it was in the past. For this reason, this particular ink transfer process is sometimes referred to as the doctorless black matrix ink transfer step. Also, because there is less contact between the transfer layer 14 and the black matrix intaglio plate 32, there is little or no adhesion between these two surfaces, thereby making the release of the black matrix ink to the transfer layer 14 on the collector easier.

Figure 3:
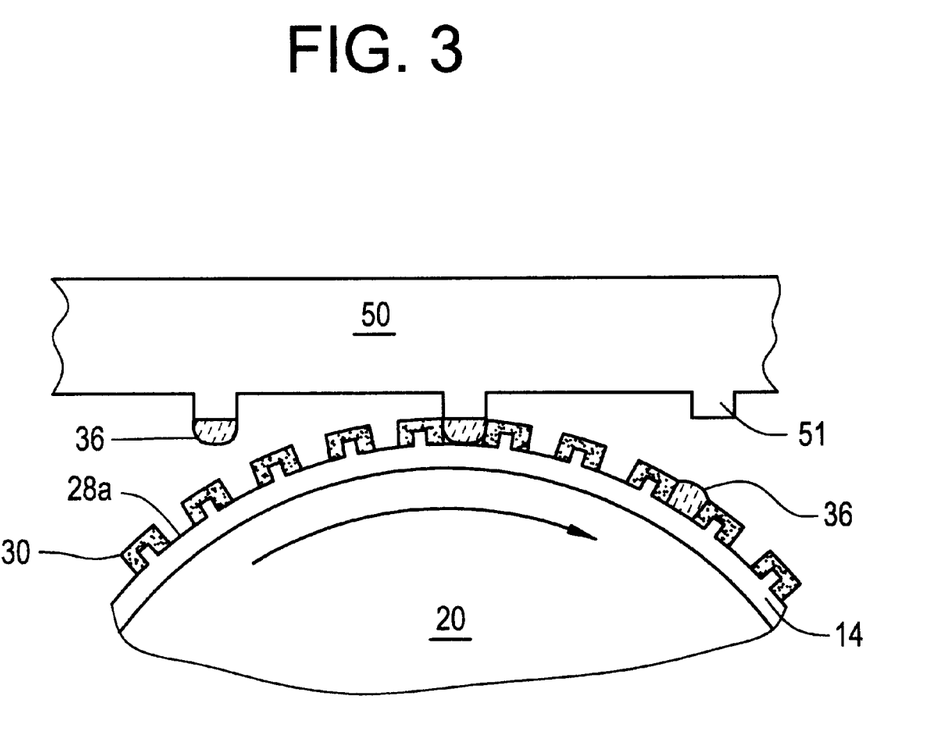
FIG. 3 illustrates deposition of colored ink into the recesses formed by a raised black matrix pattern formed in accordance with the invention.

After formation of the black matrix pattern 30, the various colored ink patterns are deposited within the recesses 11 formed by black matrix pattern 30 using a typographic ink imaging pattern, as illustrated in FIG. 3. In FIG. 3, pattern plate 50 comprises a plurality of ink imaging pins 51. The imaging pins 51 carry the various colored inks 36 and deposit the inks within the recesses 28a formed by black matrix pattern 30. As can be seen in the illustration, the ink 36 is preferably still fluid after deposition and may extend somewhat above the surface of the black matrix pattern. FIG. 3 illustrates the deposition of one of the color inks onto transfer layer 14. This process is then repeated with the other color inks which make up the color filter.

The typographic imaging pins 51 preferably are smaller than the spaces 28a formed by the black matrix, to facilitate depositing the ink within the black matrix pattern without smearing the ink on the black matrix or mixing the different ink colors.

The transfer layer may be formed using, for example, those materials selected from the group consisting of polyimides, epoxies, acrylics, vinyl ethers, polyurethanes, polyesters, and acrylated or methacrylated acrylics, esters, urethanes, or epoxides, and other materials which are conventionally useful as planarizing layers in conventional color filter devices. A preferred material for the transfer layer 14 is a radiation curable acrylate material, such as is described below. The transfer layer 14 is deposited onto a collector device as a thin film, typically less than 10 microns. Preferably, the transfer layer is formed of a radiation curable material to facilitate curing. Further information related to ink deposition, transfer layers and associated materials, and so forth may be found in U.S. Pat. No. 5,544,582 and 5,514,503.

Figure 4:
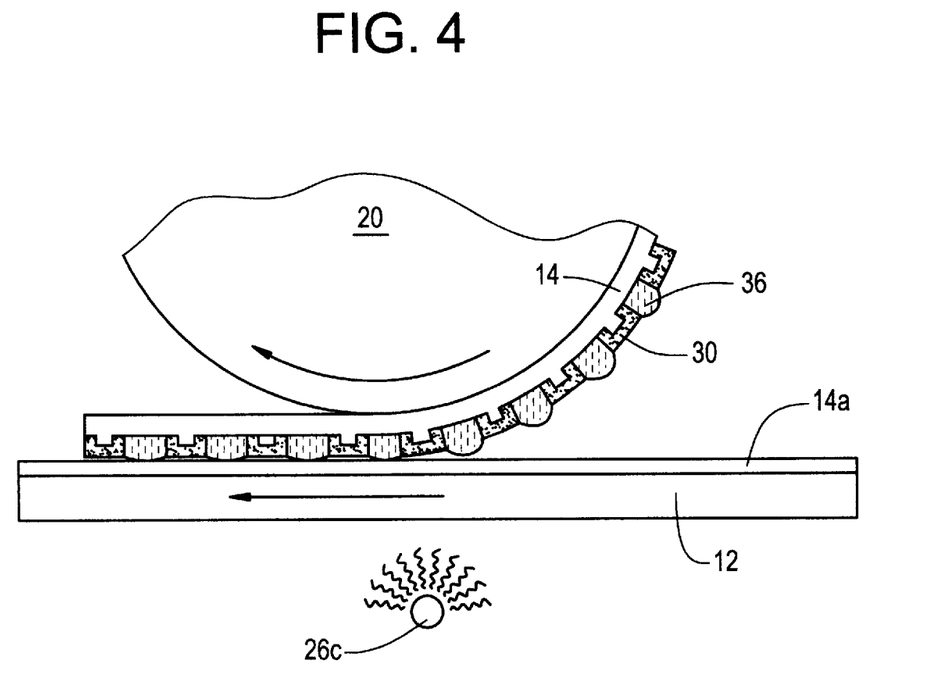
FIG. 4 illustrates the deposition of a color filter pattern, formed in accordance with the present invention, to a glass substrate.

FIG. 4 illustrates the deposition of black matrix pattern 30, color filter pattern 36, and transfer layer 14 to a glass substrate 12. During deposition of the composite to the substrate, the ink cells 36 which comprise the red, green and blue color cells may be in a liquid or otherwise deformable state. Consequently, the ink cells are preferably squeezed, during the deposition, between transfer layer 14 and glass substrate 12, and thereby deformed to a smoother, more uniform ink dot shape and thickness. This more uniform shape and thickness is retained, preferably by curing simultaneous to the transfer operation. Such curing can be accomplished via UV light 26c, which is positioned to emit radiation through the glass substrate 12. In a preferred embodiment, a second transfer layer 14a is employed to help remove the transfer layer 14, black matrix pattern 30, and colored inks 36 from the collector 20. This second transfer layer 14a may be applied over the black matrix pattern 30 and colored inks 36, or deposited onto the glass prior to the transfer operation. In FIG. 4, second transfer layer 14a is shown preapplied to the glass substrate 12.

Set forth below are two formulations which may be used to form transfer layer 14 (descriptions of each of the ingredients are given near the end of this specification). Each of these formulations consist of a base oligomer and polymer blend, which is set forth in weight percent values adding up to 100, to which additional ingredients (photoinitiators, antioxidants, and so forth) are preferably added. These additional ingredients are added as parts by weight to 100 parts of the total oligomer and polymer blend formulation. Currently, the most preferred formulation for transfer layer 14 is formulation B.

| | | p.b.w. |
|---|---|---|
| Transfer layer 14 formulation A | | |
| Base oligomer and polymer blend | SR-444 | 62 |
| | SB 500 E50 | 8 |
| | CN 963 E75 | 10 |
| | SR-9003 | 20 |
| | | 100 |
| Additives | Lucirin TPO | 1.5 |
| | Irganox 1035 | 1.5 |
| Transfer layer 14 formulation B | | |
| Base oligomer and polymer blend | GE 494-14-5079 | 69 |
| | SR444 | 27 |
| | SB 500E50 | 4 |
| | | 100 |
| Additives | Lucirin TPO | 1.5 |
| | Irganox 1035 | 1.5 |
| Second transfer layer 14a | | |
| The following is a preferred formulation to form second transfer layer 14a: | | |
| Base oligomer and polymer blend | SR-9003 | 25 |
| | SR-502 | 40 |
| | Ebecryl 3605 | 35 |
| | | 100 |
| Additives | Lucirin TPO | 3 |
| | Irganox 1035 | 2 |
| | Resiflow LG-99 | 2 |

For embodiments in which an ink (black matrix and/or color ink) is cured, the ink is preferably formulated to be radiation curable. By curable, it is meant that the ink cross-links. By radiation curable, it is meant that the ink cross-links when exposed to appropriate radiation. This is regardless of whether the ink also has hot melt thermoplastic properties in the uncured (uncross-linked) state or incorporates a solvent. For example, radiation source 26c could be designed to emit ultraviolet (160–400 $\mu$m) or visible (400–700 $\mu$m) radiation. Alternatively, the ink can be exposed to the radiation by other methods, such as by aiming a radiation source at the separation side of the nip formed by the roll and the substrate. While such curing may be done by radiation curing using conventional radiation emitting lamps, alternatively a laser could be used, guided by mirrors, to cure (crosslink) the ink sufficiently.

Color filters typically require approximately 15–40 micron width black matrix lines, and small color cells which are typically on the order of about 70–100 microns in width by 160 to 300 microns in length. The color cells are typically printed in films less than about 10 microns thick, and preferably less than 5 microns thick. These thin color cells must be evenly applied and accurately registered within the black matrix patterns. In carrying out the present invention, conventional radiation-curable inks are generally preferred over thermoplastic inks, partly because they can be printed at lower viscosities, which helps in printing such thin cells. Also, it is more difficult to control the pattern registration of hot melt thermoplastic inks, as they require extremely tight thermal tolerances to control pattern dimensions. In addition, radiation curable inks are easily cured during compression transfer operations in accordance with the invention. Thermoplastic inks do have at least one advantage, in that they can be formulated to set up immediately upon deposition to a substrate or transfer roll having a lower temperature, resulting in less pinholes, film non-uniformities and other such defects which can be caused by inadequate wetting of transfer surfaces. Consequently, another preferred type of ink is one that displays both thermoplastic and radiation curable properties. Such an ink is one which is formulated to be thermoplastic until printed to the substrate, at which point it can be cured by exposure to appropriate radiation. By cured, it is meant that the ink is to some extent cross-linked. Cross-linking of the ink increases its durability and resistance to higher temperatures, which is preferable due to the temperatures the color filter will be exposed to in subsequent processing steps.

It is known that adding certain surface active agents such as silicone acrylates to the black matrix ink that these agents upon curing of the black matrix ink make the ink difficult to wet by the sub-pixel inks in their cell, and thereby prevents co-mingling of colors along the cell walls. Unfortunately with the more conventional doctoring process, even when doctoring is haze-free, the surface active agents are present in a thin organic layer on the top of the intaglio surface which transfers to the transfer layer forming the cell bottom. This renders the cell bottom also dewetting which prevents complete cell fill by the sub-pixel inks. This process for forming the black matrix avoids this problem since the cell bottom would no longer be contaminated with surface active agents in the black matrix inks.

For the black matrix ink, another preferred type of ink is a solvent based formulation in which a volatile solvent is incorporated into the ink to lower the viscosity during inking and doctoring, the solvent being chosen so that it is compatible with the ink and readily evaporated from the thin (preferably 2 to 5 micron) black matrix pattern in the intaglio plate before contact with the transfer layer. The ink may then undergo crosslinking during subsequent radiation or thermal cure.

The inks may undergo final curing, during or after deposition to the substrate, by exposure to either radiation, thermal, moisture or other type of curing process, to achieve a hard, tack-free, durable state.

The following are preferred formulations, set forth in weight percent, for forming the inks used to make the black matrix pattern and color pixels of the color filter.

| Red pixel ink | wt % |
|---|---|
| SB 520 E35 | 7.9 |
| Irganox 1035 | 2.1 |
| Irgacure 1850 | 1.9 |
| Quantacure CPTX | 0.6 |
| SR-802 | 5 |
| SR-399 | 36.5 |
| SR-454 | 20 |
| Disperbyk 161 (30% in SR-399) | 8 |
| Irgazin Red A2BN | 13 |
| Paliotol Yellow D1819 | 5 |

| Blue pixel ink | wt % |
|---|---|
| SR-399 | 60.8 |
| Irgacure 1850 | 1 |
| Irganox 1035 | 2.3 |
| Quantacure CPTX | 0.3 |
| SR-499 | 15.2 |

| -continued | |
|---|---|
| Sarbox 500 E50 | 5.4 |
| BYK 161 (30%) less volatiles | 3.5 |
| Lionel Blue ES | 11.5 |

| Green pixel ink | wt % |
|---|---|
| SR-499 | 13.7 |
| Irganox 1035 | 2.15 |
| Irgacure 369 | 2.15 |
| Quantacure CPTX | 0.7 |
| SR-399 | 45.1 |
| Sarbox 500 E50 | 14 |
| BYK 161 (30%) less volatiles | 3.5 |
| Heliogen Green L9361 | 15.2 |
| Paliotol Yellow D1819 | 3.5 |

| Black matrix ink | pbw |
|---|---|
| Regal 400R | 30 |
| SR 497 | 7.5 |
| SR 247 | 18.5 |
| SR 248 | 7.3 |
| OTA 480 | 7.5 |
| Solsperse 24000 | 5.6 |
| Jaylink 106E | 15 |
| Lucirin TPO | 2.6 |
| Irgacure 369 | 1.5 |
| Quantacure CPTX | 0.5 |
| Mold Wiz 1285N | 2.0 |
| Resiflow LG-99 | 2.0 |
| n-Butanol | 15 |
| n-Butyl Acetate | 15 |

List of ingredients

SR-444 is a pentaerythritol triacrylate monomer manufactured by Sartomer Company, Exton, Penn.

GE-494-14-5079 is an acrylated based silane containing colloidal silica dispersion, manufactured by GE CN 963 E75 is urethane acrylate oligomer, manufactured by Sartomer Company, Exton, Penn.

SR-9003 is propoxylated neopentyl glycol diacrylate, manufactured by Sartomer Company, Exton, Penn.

Lucirin TPO is photoinitiator is manufactured by BASF of Parsippany, N.J.

SR-502 is ethoxylated trimethylolpropane triacrylate, manufactured by Sartomer Company, Exton, Penn.

Ebecryl 3605 is partially acrylated diglycidylether of bisphenol A, manufactured by UCB Radcure of Smyrna, Geo.

SB 520 E35 is aromatic acid acrylate half ester in SR454, manufactured by Sartomer Company, Exton, Penn.

SR-454 is ethoxylated trimethylolpropane triacrylate, manufactured by Sartomer Company, Exton, Penn.

Irgazin Red A2BN is pigment, manufactured by Ciba (Pigments Division-Ciba-Geigy Corp), Newport, Del.

Paliotol Yellow D1819 is pigment, manufactured by BASF Corporation, Mount Olive, N.J.

SR-399 is dipentaerythritol pentacrylate, manufactured by Sartomer Company, Exton, Penn.

Lionol Blue ES is pigment, manufactured by Toyo Ink America, Englewood Cliffs, N.J.

SR-499 is ethoxylated trimethylol propane triacrylate, manufactured by Sartomer Company, Exton, Penn.

Irganox 1035 is an antioxidant manufactured by Ciba Geigy of Terrytown, N.Y.

Irgacure 369 is a photoinitiator manufactured by Ciba Geigy of Terrytown, N.Y.

Quantacure CPTX is photoinitiator manufactured by Great Lakes Fine Chemicals, Cheshire, England.

Sarbox 500 E50 is an aromatic acid methacrylate half ester in SR454 manufactured by Sartomer Company, Exton, Penn.

BYK 161 (30%) less volatiles is dispersant manufactured by BYK-Chemie USA, Wallingford, Conn. This comes 30 percent in solvent which is preferably removed, and replaced with SR-399.

Heliogen Green L9361 is pigment manufactured by BASF Corporation, Mount Olive, N.J.

Paliotol Yellow D1819 is pigment manufactured by BASF Corporation, Mount Olive, N.J.

Regal 400R is carbon black manufactured by Cabot Corporation, Billerica, Mass.

SR-497 is n-vinyl formamide, manufactured by Sartomer Company, Exton, Penn.

SR-247 is neopentylglycol diacrylate, manufactured by Sartomer Company, Exton, Penn.

SR-248 is neopentylglycol dimethacrylate, manufactured by Sartomer Company, Exton, Penn.

Solsperse 24000 is a dispersant manufactured by Zeneca Inc, Wilmington, Del.

Jaylink 106E is acrylamide functional cellulosic ether manufactured by Bomar Specialties Co., Winsted Conn.

Mold Wiz 1285N is manufactured by Axel Plastics Research Laboratories Inc., Woodside, N.Y.

Resiflow LG-99 is a flow additive manufactured by Estron Chemical.

Although the invention has been described in detail for the purpose of illustration, it is understood that such detail is solely for that purpose and variations can be made therein by those skilled in the art without departing from the spirit and scope of the invention which is defined by the following claims.

For example, in the embodiments illustrated herein, transfer layer 14 is applied to a collector roll 20. However, the present invention is not limited to collector rolls, and thus other types of collector devices, such as plates, could also be utilized. Likewise, while the embodiments illustrated herein utilize pattern rollers, flat pattern plates could also be employed. Transfer layer 14 may be applied using any technique, and preferably is applied using ink or coating applicating techniques.

What is claimed is:

1. A method of making an imaged ink pattern, comprising forming an ink receiving surface which comprises a raised surface pattern thereon comprising a plurality of raised surfaces and transferring ink to said raised surfaces by bringing said raised surface pattern into contacting relationship with an intaglio ink imaging pattern, said intaglio pattern comprising intaglio recesses containing said ink therein, to thereby selectively deposit ink from said intaglio recesses onto said raised surfaces.

2. A method of making a black matrix pattern for a color filter in accordance with claim 1, wherein the imaged ink pattern is a black matrix ink pattern, and said ink is black matrix ink.

3. The method of claim 2, wherein said transferring ink step comprises extending said raised surfaces into said intaglio recesses to transfer said ink to said raised surfaces.

4. The method of claim 3, wherein portions of said ink receiving surface between said raised surfaces do not contact ink from said intaglio recesses.

5. The method of claim 4, further comprising selectively curing said black matrix ink during said transferring step.

6. The method of claim 5, wherein areas of said intaglio plate between said recesses are provided with radiation masking areas, and said selectively curing step comprises emitting radiation through said intaglio imaging plate between said radiation masking areas.

7. The method of claim 3, further comprising selectively curing said black matrix ink during said transferring step.

8. The method of claim 7, wherein areas of said intaglio plate between said recesses are provided with radiation masking areas, and said selectively curing step comprises emitting radiation through said intaglio imaging plate between said radiation masking areas.

9. The method of claim 2, further comprising selectively curing said black matrix ink during said transferring step.

10. The method of claim 9, wherein areas of said intaglio plate between said recesses are provided with radiation masking areas, and said selectively curing step comprises emitting radiation through said intaglio imaging plate between said radiation masking areas.

* * * * *